(12) United States Patent
Poulsen

(10) Patent No.: US 8,027,770 B2
(45) Date of Patent: Sep. 27, 2011

(54) SYSTEM FOR SELECTIVE TREATMENT OF PLANTS IN A ROW

(76) Inventor: Frank Poulsen, Hvalso (DK)

( * ) Notice: Subject to any disclaimer, the term of this patent is extended or adjusted under 35 U.S.C. 154(b) by 683 days.

(21) Appl. No.: 11/569,715

(22) PCT Filed: May 9, 2005

(86) PCT No.: PCT/DK2005/000311
§ 371 (c)(1), (2), (4) Date: May 5, 2009

(87) PCT Pub. No.: WO2006/021207
PCT Pub. Date: Mar. 2, 2006

(65) Prior Publication Data
US 2009/0210119 A1  Aug. 20, 2009

(30) Foreign Application Priority Data
May 10, 2004 (DK) .................. 2004 00747

(51) Int. Cl.
G06F 7/70 (2006.01)
G06F 19/00 (2006.01)
G06G 7/00 (2006.01)
G06G 7/76 (2006.01)

(52) U.S. Cl. ........................................ 701/50

(58) Field of Classification Search .............. 701/50, 701/207, 208, 205, 213, 300; 172/2; 239/69, 239/170, 155, 159; 47/1.7, 1.01 R, 1.01 P; 250/221, 226, 338.1, 222.1; 342/457, 357.2–357.78; 356/4.1, 407, 416, 425; 209/580–582
See application file for complete search history.

(56) References Cited

U.S. PATENT DOCUMENTS

| 5,793,035 A | 8/1998 | Beck et al. |
| 5,809,440 A | 9/1998 | Beck et al. |
| 6,443,365 B1 | 9/2002 | Tucker et al. |
| 6,454,183 B1 | 9/2002 | Hedegaard |
| 2003/0019949 A1 | 1/2003 | Solie et al. |

FOREIGN PATENT DOCUMENTS

| FR | 2718922 A1 | 10/1995 |
| JP | 9047204 A | 2/1997 |
| WO | WO 0003589 A1 | 1/2000 |

Primary Examiner — Christopher J. Novosad
(74) Attorney, Agent, or Firm — AKC Patents LLC; Aliki K. Collins

(57) ABSTRACT

A system for selective treatment of plants arranged in rows extending along a first direction includes a camera arranged along the first direction over a row of plants and a set of treatment units arranged at a first distance behind the camera along the first direction and over the row of plants. The camera is configured to move along the first direction while obtaining images of a target area that includes one or more plants that are to be treated. The set of treatment units is also configured to move along the first direction behind the camera while maintaining the first distance. The system generates a map of digitized unitary spots covering the target area based on the obtained images, and then sends the generated map to a computing unit, where a plant treatment application adds spot-specific plant treatment instructions to the generated map. The system synchronizes the set of treatment units to treat each of the unitary spots in the target area according to the spot-specific plant treatment instructions at the time when the set of treatment units is positioned over each of the unitary spots. The set of treatment units includes a plurality of individually controllable treatment units arranged consecutively along the first direction. Each individually controllable treatment unit consecutively applies a fraction of the entire spot-specific plant treatment instructions to each unitary spot in the target area until the entire spot-specific plant treatment instructions for each unitary spot are fulfilled.

18 Claims, 4 Drawing Sheets

SYSTEM FOR SELECTIVE TREATMENT OF PLANTS IN A ROW

FIELD OF APPLICATION

This invention addresses selective treatment of plants growing substantially in a row. More specifically the present invention concerns systems for selective treatment of stationary modular spots of such row, such modular spot being defined via some camera-based, decision-making, mapping technique to represent plant(s) or part(s) of plant(s), whose growth is either to be promoted, to be neutrally left, to be relatively retarded, or to be destroyed by treatment, or to represent bare soil requiring treatment or not.

DEFINITIONS

Useful culture plants for later harvesting are normally sown as seeds or placed as "preplants" in the soil, organized in one or more adjacent rows, normally by a machine. As seeds/preplants also can be individually located mutually substantially equispaced along the same row in the "machine direction" from planting-time, also row patterns in directions deviating from the machine direction can occur/be created, e.g by synchronizing the position of sowing/hoeing for more adjacent rows; so, substantially linear patterns of successive plants can be established also e.g square to the machine direction. Any such linear, practically accessible series of plants can be chosen as a "row" in the present description/claims with the understanding, that more "rows" for simultaneous treatment are substantially parallel.

Even if placed in the soil simultaneously, the culture plants can be of same or different kind(s) meant for subsequent harvesting with substantial time interval(s). Seeds and other living plant residuals still randomly present in the soil after the treatment of the soil for sowing/planting in and around a row, may yield to the growth of other plants parasitting on the possibly spread fertilizer, often dominating the growth of the culture plants, and being unwanted for harvest.

When treatment is to be executed on plants substantially in a row, simultaneously criteria are defined for: which type(s) of plant(s) to have their growth promoted, and which plants are to have their growth relatively retarded or even destroyed. In this description and in the appended claims, the term "crop" is used for plants of the first type mentioned (i.e. selected to have their growth promoted at the time of treatment); and the term "weed" is used for the other plants, even if some of these at the time of treatment should be culture plants being surplus to thin out, or for later harvesting.

By growing "substantially in a row" is here meant: growing at the line defining the row (re. above) and/or in the strip of soil adjacent hereto, which is left over from or is unattainable for treatment by means treating the soil laterally to the row to eliminate weeds (normally: mechanical and simultaneous treatment between more rows).

BACKGROUND

Various camera-based, decision-making, mapping techniques to represent a plant or a part of a plant for treatment, such treatment being stimulating/hindering the growth, are known: Some systems use plant recognition by means of analysis of radiated/reflected spectra being specific to the plants of interest; other systems use pattern recognition technique based on analysis of form and structure of leaves from the relevant plants; even systems discriminating crop/weed depending of determination of plant height are known. Such systems are often "biased" with additional information of characteristics of the plants/crop/weeds expected to be involved, and/or of the characteristics of the place of growth, e.g. data from previous mapping of same field—possibly with same rows of plants, etc. U.S. Pat. No. 5,793,035 discloses examples of such techniques.

The invention is not specifically related to a specific one of such techniques, as the most suited for the actual need may be selected—alone or in combination(s).

The point in the use of an appropriate mapping technique in relation to the inventive apparatus comprising individually controllable treatment means, comprises:

moving the "camera" means along the one or more rows, in which the plants of interest for treatment are positioned, and so, that the area(s) actually being observed/recorded by the camera means is/are located a physical distance in front to the target area of the treatment means, to yield time during movement forwards, to establish a prepared map of digitized unitary spots covering the area for treatment, so this prepared map in the form of an organized data structure is available to the treatment means, when their target area is positioned over the physical area represented by the prepared map;

via the camera observations, biasing data, and decisive software, also preparing the map with inclusion of spot-specific information of nature of treatment decided;

via speed-of-movement data, and via the actual physical distance from a physical unitary spot in the area of interest for treatment at an observation point of time, to the target area of the treatment means—at the same point of time, (to a little later treat said physical unitary spot,) synchronizing the treatment means to treat said physical unitary spot with the decided treatment, when at treatment-time being positioned/"framed" in the target area.

From above is to be understood, that a prepared map is a dynamic phenomenon, as such a treatment system normally in a suitable elevation is being continuously moved along the rows, at a suitable speed; thus, the camera means all the time during the movement, at the front "take in" successive lines across the direction of movement, of new spots to be mapped and decided for, while the treatment means a distance rearward "leave behind" "used" spots after their passage of the target area, which is moved together with the system. The map can to some degree be imagined as a semi-stationary overlay on an area for treatment, being rolled out by the system on that area at observation time, being transformed to a prepared state and used for the decided treatment during the system's passage of that area, and the overlay/map then being rolled in again by the system after the prepared map overlay has been used and passed by the treatment means.

PRIOR ART AND PROBLEMS

In known arrangements of this type the camera means often are arranged on a common bar mounted in front of a tractor across the direction of movement of the tractor along the row(s) with plants to be treated. The treatment means then often are mounted to a common crossbeam drawn/carried behind the tractor, side by side and including for each spot in the cross direction a controlled spraying nozzle for herbicide, nutrient, water or other selected fluid agent. Of course, many other physical system layouts also are possible. Also, all other necessary measuring/activation means, data receiving/storing/computing means, moving means, and storing/handling means for treatment agent, etc. for correct system function, naturally are present to complete the system—this is of course to be understood anywhere in this description with appended claims.

When the target area of a treatment means is positioned over a physical spot, this physical spot and possible plant(s) there is given a treatment according to the decided treatment for the corresponding spot in the prepared map, such treatment normally consisting of the result of a switching on or off of the treatment means for a period of time related to the spot's passage of the target area. If more physical spots at the map preparation have been decided to receive the same treatment and are consecutively arriving to the target area, the treatment means for that target area of course can be left on/off for the next spot passing, to receive the same treatment. The treatment means are controlled spraying nozzles delivering nutrient, water, cleaning agent, herbicide, or the like, thus having an effect accordingly, which is promoting, retarding, or destructive to plants; of course also a neutral treatment is possible, which is desirable e.g. when spots of bare soil decided to require no treatment, are passing the target area. According to the functioning of the treatment means and the effect of the treatment therefrom, the treatment can result in one of e.g: culture plants being thinned out leaving the crop with more distant spacing, by destroying the intermediate culture plants/weed in the direction of movement; the growth of crop being promoted by spraying e.g. nutrient thereto; the weed being destroyed by applied herbicide; or the culture plants not contributing to the actual crop being retarded e.g. by spraying with a retarder e.g. reducing light admission to leaves.

The use of known such systems has revealed severe problems: The speed of forward movement is very restricted, as e.g. the nozzle during the passage of a spot decided for destructive treatment has to deliver sufficient poisonous substance to destroy the plant(s) during the passage of that spot, and without spreading the herbicide to adjacent spots, which may have been decided in the prepared map not to receive treatment from this or adjacent nozzles, which may have a staggered layout along the cross direction; as use of highly concentrated herbicide (which could be applied spotwise in very small quantities) generally is unwanted/forbidden for general environmental reasons, a bigger amount of a weaker solution with herbicide must therefore be sprayed to the spot and with a restricted intensity, not to spread to adjacent spots, thus requiring a relatively long spraying time. Another speed restricting effect arises from the switching on/off characteristics of the nozzle during passage to a next spot requiring the inverse functioning of the nozzle, e.g. shift form on to off or vice versa. Therefore, known systems due to above has a relatively slow maximum forward operation speed, if the result of the treatment is to accord with the treatment decided in the prepared map.

Another type of problem met at known systems is that malfunctioning of a treatment means most probably will lead to loss of crop or survival of weed, e.g. if a herbicide spraying nozzle is not correctly shut off or activated, respectively. A problem also encountered, which yields effects comparable to the malfunctioning problem, consists is spontaneous and hardly controllable deviation by possible winds, of the sprayed herbicide to other spots than the decided one, thus not fulfilling the destruction of the weed at that spot decided, and possibly harming crop elsewhere, meaning that both the quality of the harvest is lowered from a high weed content, and that harvested quantity of crop is reduced form the destroyed/weakened growth of unintentionally herbicide affected crop.

PURPOSE OF THE INVENTION

Therefore, the goal of the present invention is to overcome the above mentioned problems, thus providing increased overall operation speed for treatment according to the prepared map, and higher functional security, even if a treatment means should malfunction, thus yielding higher productivity with improved quality in a doubled sense.

This goal and other beneficial effects is reached by systems of above type, which according to the invention also comprise the characterizing features of claim 1.

DISCLOSURE OF THE INVENTION

Thus, the invention is characterized in the system-comprised apparatus comprising individually controllable treatment means having an individual target area, comprises at least one series, wherein more than one, preferably at least four, more preferably at least ten, individually controllable treatment means are consecutively situated, the series being positioned over a row for treatment and along the direction of movement of the actual system along the row(s).

This inventive feature allows the spots in at least one strip of a row to be treated by the series of treatment means, as each physical spot in the respective strip of the row is "framed" a number of times corresponding to the number of treatment means in the series, the spot each next time being framed by the target area of the consecutive/succeeding next treatment means in the series during the passage of the system.

The treatment desired for the actual spot, can then—according to the biasing data, camera means observations, etc.—by computing be decided in the prepared map to be distributed on more treatment means, meaning: each treatment means in the series only needs to deliver a part of the total decided treatment for the spot concerned. This means, that the individual treatment means can be designed with substantially faster action, thereby requiring less time to treat the spot, meaning, the speed of movement of the system in the forward direction along the row(s) to be treated, can be increased, until the passage-time of the target area is reduced to the major of: time of treatment and the minimum non-treatment time. The combined effect of the invention therefore is, that any spot framed by an inventive series of treatment means, can be given the decided total treatment as the sum of more successive part-treatments, each being delivered faster at a higher overall speed of system forward movement. The productivity of the system, therefore, is substantially increased.

E.g. for treatment means in the form of spraying nozzles, the inventive effect can be achieved by each nozzle in a series only having to deliver a fraction of the total amount of herbicide for e.g. a destructive treatment for a decided spot; the individual spraying time therefore can be shortened for higher speed forwards. Also the physical nozzle/valving dimensions can be reduced, what can lead to faster responding units, to be converted to higher forward system speed.

As the total treatment decided for a spot now can be distributed on more treatment means, the effect of malfunction of a treatment means is reduced to the effect of the malfunctioning part-treatment, thus resulting in a much higher security for retention of the crop and e.g. destruction of the weed, yielding an important overall quality and quantity improvement of the crop harvested; the same beneficial effect arises from the reduced overall effect from disturbing winds.

Another important feature of the inventive systems is the possibility now created to use environmental-friendly controlled e.g. gas-fired burners as treatment means: Due to the fast switching characteristics required, and to the restricted physical size of decided spots, such burners are relatively small and cannot one burner alone deliver a sufficient amount of heat energy in a required short time to destroy the weed of a spot; but the summed effect of smaller modular amount of heat delivered in fast succession without substantial intercooling from more consecutive such burners can add up to have a destructive effect.

Another way to exploit the new possibilities of the inventive systems, is to keep the forward system speed relatively low, and then spray the "usual amount" from each nozzle in the series, but now with a much more thinned herbicide solution, to work environmental-friendly with the weaker solution, still delivering the same total amount of herbicide required for a decided spot.

Of course also combinations of such beneficial functions/effect are foreseeable.

Beneficially the inventive systems also can comprise at least set of more, preferably three, more preferably eight or more, adjacent series of individual treatment means with individual target areas, preferably with their target areas arranged sideways to cover the spots from the prepared map representing the physical spots for possible plants growing substantially in the one/more row(s) having a respective set over. By this a much more also sideways detailed treatment can be effectuated, yielding still higher security in the correct retention/destruction/etc. of the plants or part(s) thereof, thus also hindering waste of e.g. herbicide, by restricting the use thereof to the relevant—now possibly smaller—spots of a set.

Also inventive systems according to above can utilize information of the direction of extension of the row to be treated, established by means of the camera means and related computing means, to steer the moving means to center the series over their respective row(s). Such feature is by itself known in related prior art and can—used in connection with the invention—increase the overall accuracy for the treatment, as the prepared map to a still higher degree, especially in lateral directions, is "kept directly over" the corresponding physical spots. The function can have different practical designs spanning from delivering warning/correction signals (lamps, displays, sound, possibly graduated) to a human driver of a tractor moving the system forwards, to total takeover of the mover's steering by e.g. interfering in the servo-steering system.

Preferably, inventive systems can have more sets of series or single-series mounted in parallel to a common structure, each such series (set) to treat a respective one of rows for treatment extending substantially parallel. By this, relatively cheaper productivity can be achieved, as such multi-row system can be moved in common by only one tractor and driver. A family of elegantly optimized inventive systems has the number and positions of the (sets of) series for the respective rows installed corresponding to the layout of the e.g. sowing machine first used for the rows, and is operated by having a such system to exactly follow the sowing machine's original track.

E.g. if such elegant arrangement should not be available, a possibility exists, that the inventive systems must simultaneously treat rows originating from different "runs" of e.g. a sowing machine, wherefore perfect parallelism between rows from the different runs can not be calculated with. To secure a correct function in e.g. such situation, the inventive systems can have at least one single or set of series positionable sideways by information of the direction of extension of the respective row(s), being established by means of the row-specific camera means and related computing means, to side-adjust the row-specific series to center over respective row(s) along the length direction. In effect, all single/sets of series the can be "side-floatingly" mounted to a common structure, e.g. carried by a tractor; all singles/sets can in this way identify and correctly follow the extension of their respective row.

If an embodiment comprising steering control (re. above) is involved, preferably the series bringing about the steering is used as a fix reference for side-adjustment, as this single/set of series by proper system supported steering, should not require further side-adjustment.

Inventive systems also can have installed means to treat the soil adjacent/between row(s). Such means can be of any known type, e.g. for mechanical treatment and/or for—possibly selectively—destructive treatment of plants detected to be present, by e.g controlled burners. The benefit here is e.g. the saving in tractor and driver working hours, as the whole field strip laterally covered by such inventive systems, can be treated in one pass.

Systems according to the present invention can have the treatment means in series modularized for easy individual/mutual interchangeability/repair/service/change of functionality of means, preferably at/to any given position for such modularized treatment means, and the treatment means in series can function as individually controlled: burners, blow-evaporating fluid particle cannons, power lasers, (hot/abrasive) air/gas-jets, (abrasive) water-jets, spraying nozzles, plasma jets, or other known equivalent type of unit. So, the type of treatment means estimated to be best suited for the approaching treatment work can quickly be combined and installed in the system-comprised apparatus comprising individually controllable treatment means.

When further treatment means in at least one series are installed being of more than one type, in addition to the possibility to create more types of treatments with the same series fitted with treatment means all similar (e.g. destructive treatment of a spot by using all burners thereon, but only retarding treatment of another spot in the same strip by using e.g. every third burner in the series, so, e.g. with two consecutive "cooling frames"), also mutually incompatible treatments can be delivered to e.g. consecutive spots in the strip, such spot first framed e.g. being decided to be crop to receive spraying with nutrient, while the following spot e.g. might be decided to be a part of a plant for later harvest, now requiring spraying with a retarder as limewater to later be rained or spray-washed off. Of course also a combination-treatment can now be established from the known different patterns of function, to treat physical spots hosting e.g. very intricate sorts of weed, requiring both an e.g. burning of super-soil parts, and a herbicide treatment for sub-soil living residues. A possibility for spot located reactive chemical multicomponent treatment, is also made possible by use of different treatment means in same series.

To achieve the highest possible speed of operation, systems according to the invention can have more and preferably all treatment means in the series being individually controlled to function/not-function substantially simultaneously.

Also the speed of movement forwards can be maximized based on type/effectivity of the installed treatment means, and on the treatment for the spots, decided in the prepared map. The speed can e.g. be detected via the camera means or via other known method, and the computed correction signal be given to the speed control system of any known type. Such speed optimization can e.g. occur, when the growth of weed in a larger, but still local area traversed by all rows under actual treatment, very successfully is/has been suppressed, thus, at the time of treatment requiring no destructive treatment from the installed burners; as retarding treatment with the burners might be the only other treatment required for some spots, more/all burners in a series can be allocated to perform the retarding treatment, which then can/must be performed at a substantial higher speed of forward movement of the inventive systems. The speed can then be increased, e.g.

until weed is detected and require full destructive treatment time by all/many burners; the speed must then be reduced accordingly and the retarding treatment consequently (again) be distributed on fewer burners in the series.

As the period of growth, wherein the treatments with the inventive systems can be fully exploited, often is of very short duration—maybe few days, it is preferable, when inventive systems are able to operate both day and night; in this connection the insufficient illumination for the camera means e.g. during night time, can then be completed by illuminating means of the systems themselves. Depending on the camera means and detection principle(s) actually used, such illumination can consist of UV, visible, and/or IR radiation.

When inventive systems have means for, at the exit from rows for treatment, be guided to other rows for treatment by an external system, e.g. of GPS or similar type, a driver is relieved from calculating this synchronizing task, which can be complicated and time consuming, if traces of the treatment already executed are hardly visible, and/or a complicated pattern of row-attack has been decided, based on physical dimensions of system equipment, making the continued treatment by simply returning over the next field strip with adjacent row(s) undesirable.

By the efforts of a skilled person and by use of supplementary known means, also systems according to the present invention can be constructed, having means to be capable of fully automotive self-functioning for a prolonged period of time, terminated by shortage of materials/agents/fuel/gas or the like consumed substance. Of course such systems also automatically can call for refilling during continued normal function, the invention thereby yielding an automat to selectively treat any spot of possible growth substantially in one or more rows in an area of soil, with a well suited, decided treatment appearing in a prepared map for the treatment means, the automat working day and night, simultaneously weeding between the rows, until the job is finished.

SHORT DESCRIPTION OF THE FIGURES

The drawing accompanying this description is showing: an example of PRIOR ART systems, and—as non-restricting examples—preferred embodiments of the present inventive systems, according to the list below. Of said drawing.

Figure 3:
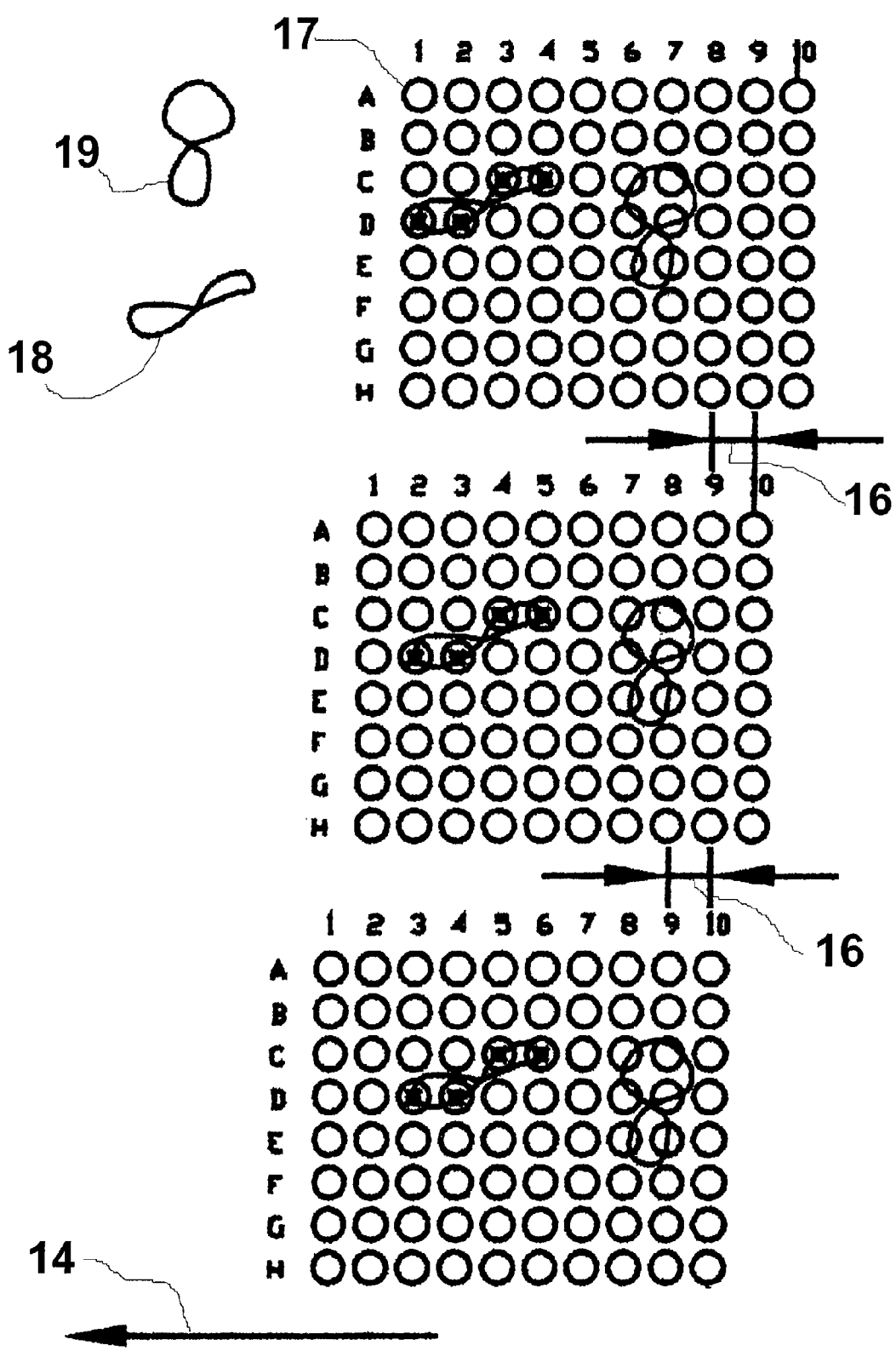
Figure 4:
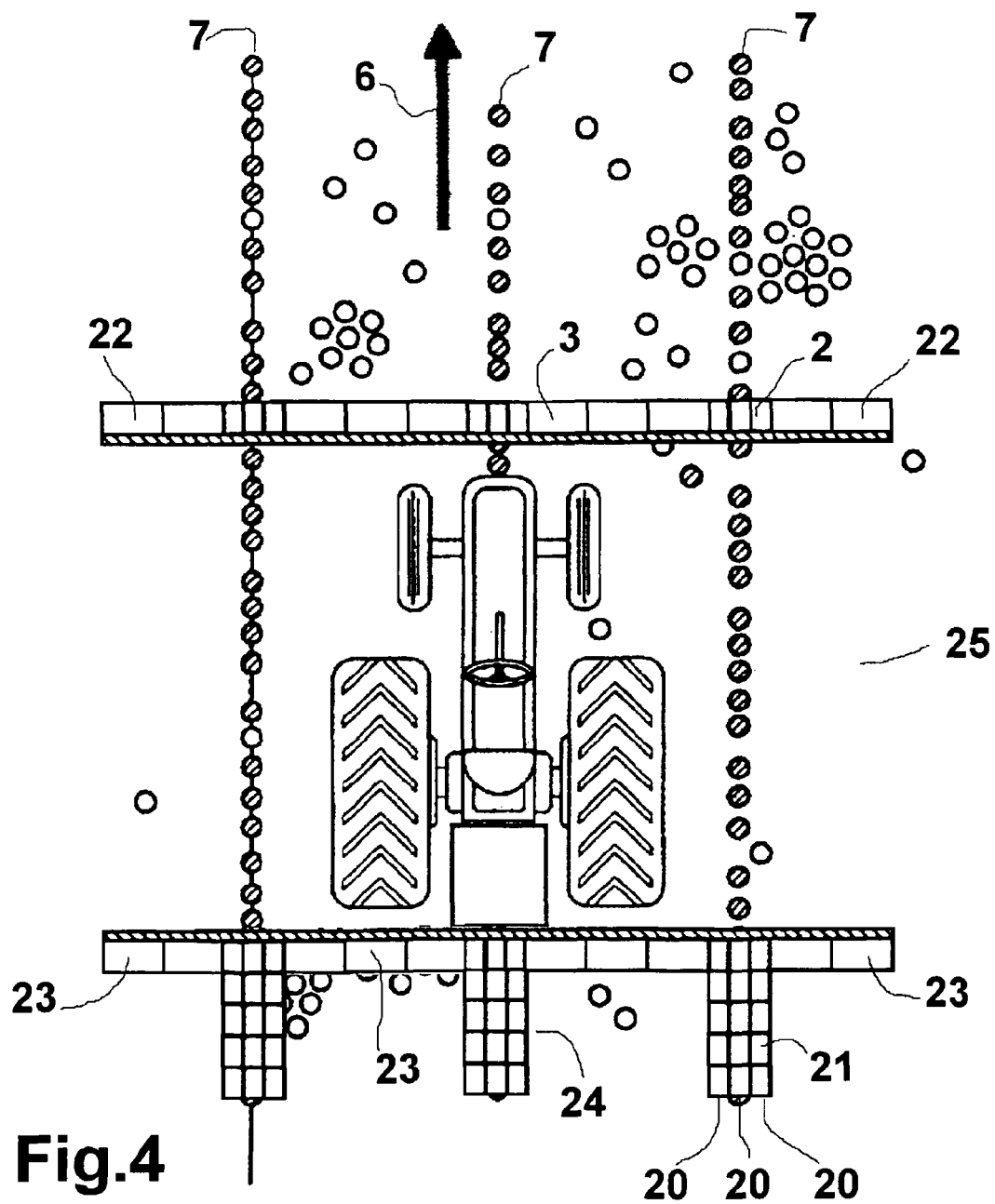

FIG. 3 shows—very schematically—a top view of a part including the treatment means of an inventive system for one row, with eight series in the set, each of ten treatment means, in three positions over the same bit of extension of a row with weed and crop; and FIG. 4 shows—schematically—a top view of an example of a system according to the present invention with camera means mounted in front of a tractor, with treatment means mounted behind and organized in three sets, each of three series each of five treatment means for each row, and with other means to simultaneously treat the areas between and to the lateral sides of the outer rows.

In the figures, similar items are identified by the same reference numbers; by 3- and 4-digit-numbers, the last two digits represent a sub-numbering of the first 1-, 2-digit numbered kind.

FURTHER EXPLANATION OF TYPICAL PRIOR ART SYSTEM

Figure 1:
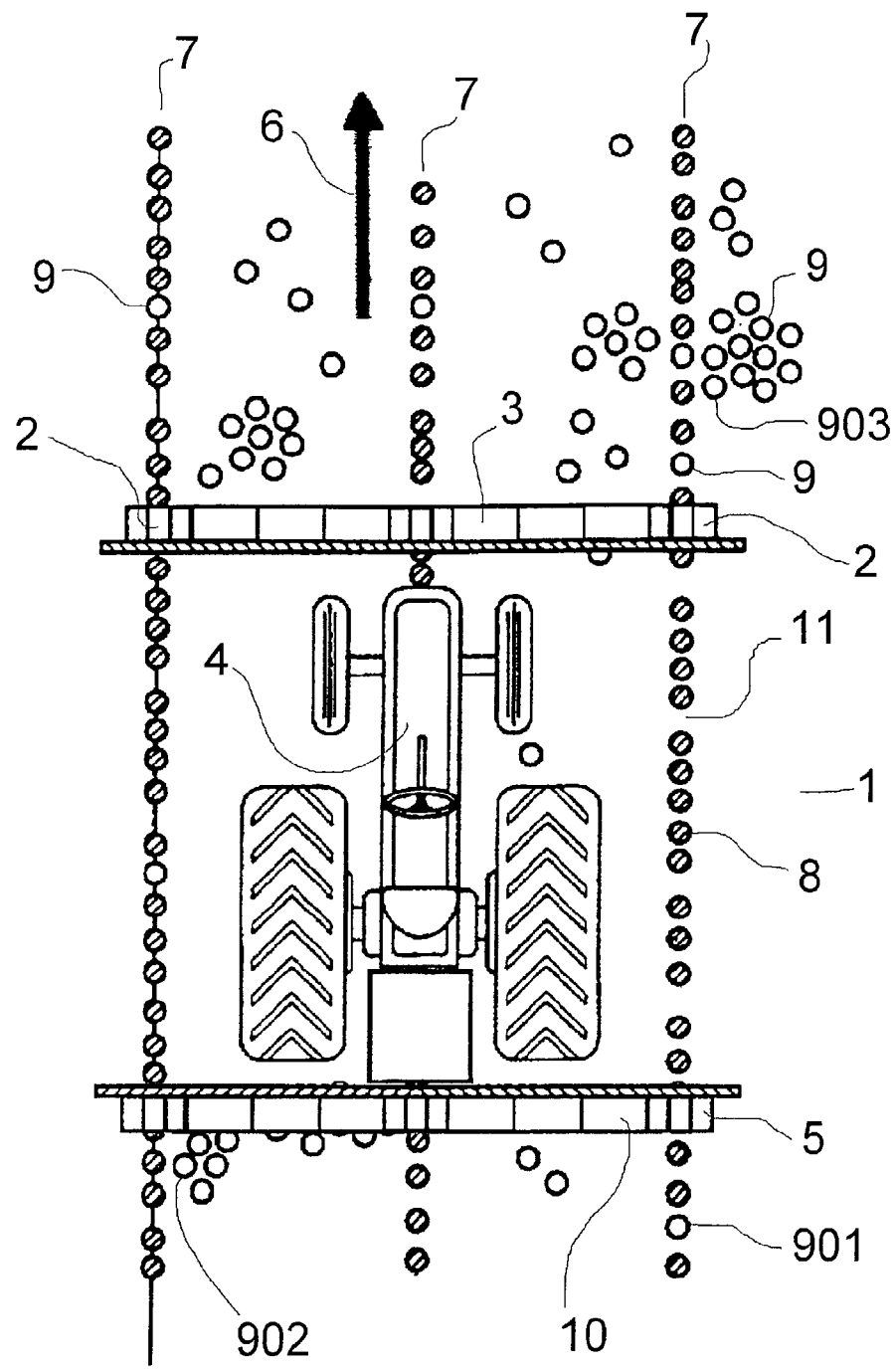
FIG. 1 shows—schematically—a top view of a typical PRIOR ART system with camera means mounted in front of a tractor, and with treatment means mounted behind.

FIG. 1 shows—schematically—a top view of a typical prior art system 1 with camera means 2, and here also 3, mounted in front of a tractor 4, and with more row treatment means 5, and other mid-area treatment means 10 mounted behind. Although a driver is not shown, the prior art system 1 by the tractor 4 is moved forwards-upwards on the FIG. 1 plane—in direction of arrow 6 along the rows 7 being stationary to the figure's plane, and wherein mainly the crop culture plants—filled circles/8—are growing, although weed plants—empty circles/9—also are growing in the rows 7 and in the areas between/outside the rows 7.

The prior art system 1 is equipped with three camera means 2/small rectangles, for each row 7, yielding division of a row 7 in three adjacent strips (vertical in FIG. 1). During the travel over the rows 7, the camera means 2 observe their respective strip of a row 7. The observations are sent to (not shown) computing means, which from input biasing data, and forward speed data of tractor 4, for modular lengths of each strip observed, decide: what was observed (weed/crop/soil), and which treatment that point of observation ("spot") is to receive; also a time reference is established, and these data are put in the map, then being prepared for this spot.

When the system 1 a little later has moved, so the target area of that strip's treatment means now is to "look at" the spot, the function of the treatment means is synchronized, so the spot from the treatment means receive the treatment, which a little earlier was decided and stored in the prepared map. In the prior art example shown in FIG. 1, the treatment of the spot typically would be: "nothing" if the spot's content was observed/computed to be crop 8 or bare soil 11, while the treatment decided, if the spot was observed/computed to be weed, would be a destructive dosis of herbicide sprayed on the spot area from the nozzle constituting the treatment means 5. In the meantime the camera means 2 observe more spots in their respective strips to furnish more spots to the prepared map.

From FIG. 1 is seen, that all weed in the left and middle rows 7 and in the right row in front of the spraying means 5 can expect to receive a destructive dosis of herbicide, when "framed" in the target area of the respective treatment means 5, while the weed-spot 901 near the bottom of the right row 7 already has been sprayed. Also the weed spot 902 might have been observed from the rightmost type-2 camera means for the left row 7 and was consequently possibly just sprayed to death. Also the weeds at 903 can expect to be "spotted" by the rightmost type-2 camera means and be put in the map with decision: "weed; treatment". Other weed in FIG. 1 most probably will not be/were not detected by the systems for row treatment. The prior art example shown in FIG. 1 has other type of camera means 3 to observe the areas between the rows for the need of treatment by other treatment means 10, which may function more "summarized" and with less accuracy in the direction of movement, as the purpose for these areas solely is to destroy all plants present.

It is to be noted, that practically, the type-2 camera function for all strips in a row often can be effectuated by one physical camera unit due to the high resolution obtainable for such camera unit. Also is to be noted, that due to the very fast data processing being available to establish the map, compared to the relatively slow mechanical forward movement of the treatment system, the treatment means 5 often can be gathered behind the camera means 2 as a combined structure at the same end of the tractor 4.

DESCRIPTION OF PREFERRED EMBODIMENTS

Figure 2:
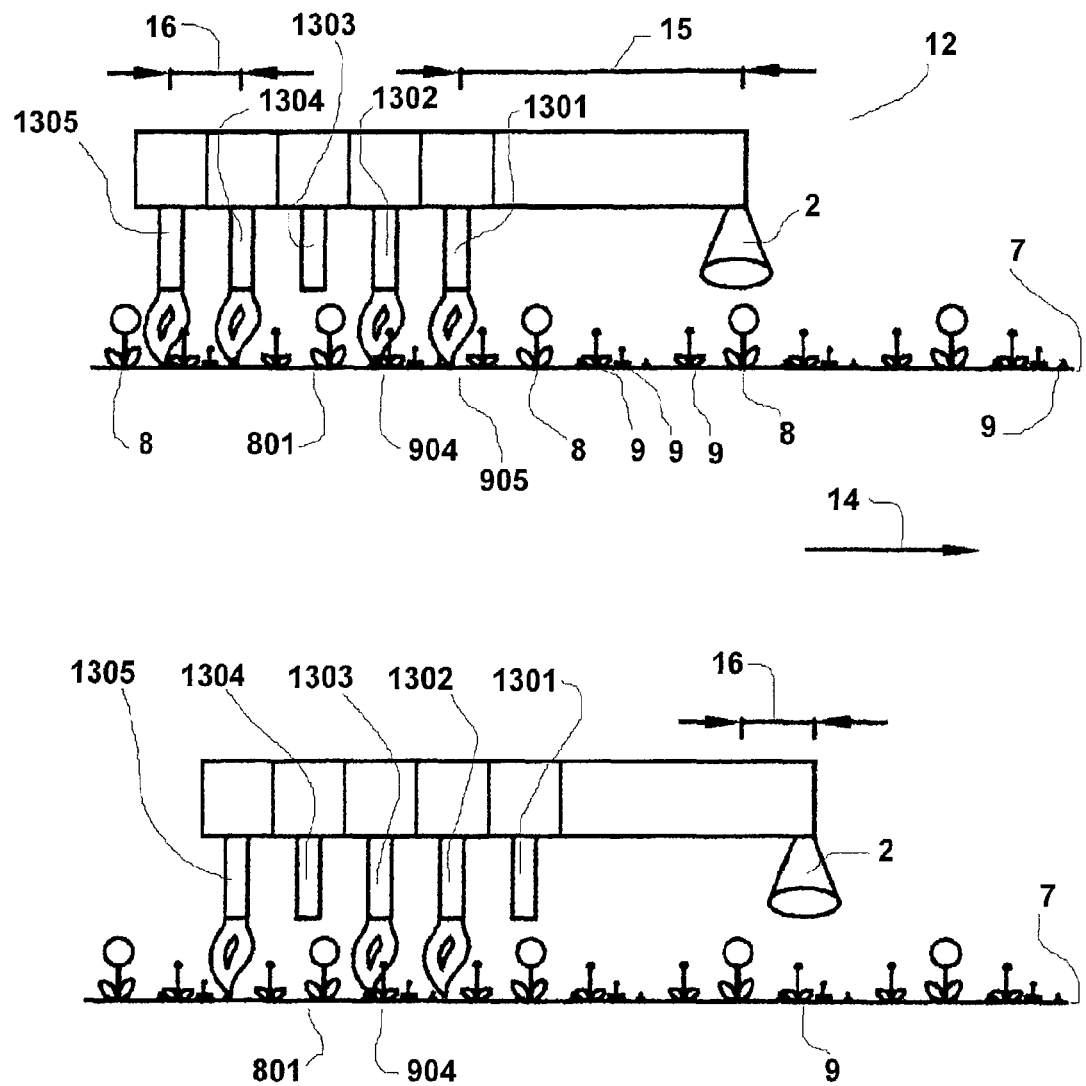
FIG. 2 shows—very schematically—a side view of an inventive system with one series of burners as treatment means, in two positions over the same extension of a row with weed and crop, observing neighboured, successive areas to define two consecutive spots for the map, and with the individually controllable treatment means treating the decided spots according to the prepared map.

FIG. 2 shows—very schematically—a side view of an inventive system 12 with one series of burners 1301-1305 as treatment means, in two positions over the same extension of a row with weed 9 and crop 8. In the upper FIG. 2 part, the camera means 2 observes the left/first one, and in the lower FIG. 2 part, the right/next one, of two neighboured, successive areas to define two consecutive spots for the map prepared for the treatment means, as the inventive system 12 is moving to the right along the row 7 in direction of the arrow 14. The observation of the first/left area yields after computing—also taking into account the biasing data, the decision: "crop, no treatment", while the decision for the map is: "weed, treatment" for the next/right area, observed in the lower FIG. 2 part.

According to the invention, the inventive systems have more than one treatment means for each (strip of a) row arranged in a series in the row direction 14. The inventive embodiment shown in FIG. 2 is configured with five consecutive treatment means in the form of burners 1301-1305; this fact due to the new possibility opened by the invention, to realistically use controlled burners as treatment means, because the limited heat amounts received by e.g. weed-spot 904 from each consecutive burner 13xx from the inventive series, are summed up in the spot's weed, thereby being destructive for the receiving plant. In FIG. 2, the treatment means 1301-1305 are equispaced, although this is not mandatory, as corrections for different spacing easily can be computed and effectuated via timing. The first treatment means/burner 1301 is positioned a fix distance 15 after the camera means 2, and the function/firing on a "framed" spot is controlled via the decision for that spot, contained in the prepared map.

To be noted here is, that if the treatment means installed in the inventive system shown in FIG. 2 with five treatment means in the series, are nozzles "treating" by spraying herbicide, the execution of the decision "weed, treatment" from the prepared map, will yield only principally a fifth of the total decided amount of herbicide (solution) being delivered from the first nozzle. The delivery from that nozzle therefore can be executed principally five times faster than by a known system, thus permitting the forward motion speed of the inventive system being multiplied (principally five times). As the period of herbicide spraying, is the critical one for the treatment process, the point is, that "the rest of the herbicide comes later" during subsequent spraying periods, "hidden" in the overall time-pattern.

Common to both e.g. nozzles and burners as treatment means mounted in an inventive series, is a re-use of data from the prepared map at each next treatment means in the series, with a time delay corresponding to the actual physical offset behind the first treatment means, combined with the system's forward speed. As the treatment means 13xx in FIG. 2 are modularized for fast replacement/interchangeability and simplified computing, the interspacing 16 here is constant.

In the upper part of FIG. 2 is now to be seen, that the weed-spot 904 a moment ago was "flamed" by the first burner 1301 (which still is firing, as also the next spot 905 according to the previous camera observations, was decided to be treatment requiring "weed"). Shown is, that the weed-spot 904 now is receiving heat from the second burner 1302 in the series. The third burner 1303 is off, as the framed spot was decided to be "crop" 801, not to have treatment.

A little later the inventive system 12 has moved a unitary distance 16 forwards to the position shown in the lower part of FIG. 2. New area for the map is being observed by the camera means 2, and treatment continues. So, the weed-spot 904 now is receiving heat from the third burner 1303, which has been controlled to be active in the meantime since framing the crop 801. The fourth burner 1304 now is controlled to be off, because it is framing the spot 801, in the prepared map still being decided as "crop". Also the first burner 1301 now is framing "crop" and is inactive.

The reader easily now can understand, that after the next unitary step forwards 14 of length 16, the burner 1304 will be positioned to frame the weed-spot 904; it will be active and will deliver the fourth part-heat-treatment to the weed-spot 904. At the same time the fifth burner 1305 will be inactive, as it will be framing the crop-spot 801.

One more unitary step later, the fifth burner 1305 will be controlled to be active and will frame the weed-spot 904 to deliver the last of the five consecutive part-heat-treatments, which sum up to be a destructive treatment for the weed at spot 904, even if none of the individual burners can deliver a destructive treatment alone in a reasonable short time. Analogously the weed-spot 904 now would have received 5 consecutive sprayings, summing up to a destructive dosis of herbicide, if the five treatment means in the series were spraying nozzles.

To note from FIG. 2 and above explanation is, that all treatment means principally are functioning at the same time, but on different treatment tasks for successive spots.

The above division in discrete unitary steps as 16, has mainly been made for explanatory reasons, as the inventive system 12 preferably in reality is moving continuously forwards 14.

FIG. 3 shows—very schematically—a top view of a part including the treatment means 17 (typical) of an inventive one-set system for one row, with eight series A-H, each of ten treatment means, in three positions over the same part of a row extending along the direction of arrow 14.

The FIG. 3 top-to-bottom sequence is mainly to illustrate, that also groups of related spots characterizing one larger plant/plant assembly with a substantial varying extension in the row's square direction, be treated by an inventive system with an adequate number of adjacent series, together covering one row (including lateral strips to the sides being non-treated/-accessible by the means for treating the areas between rows).

The oblong structure like 18 is easily identified in the row under the pattern of eight horizontal series A-H of treatment means being stepped forwards to the left in FIG. 3 along the row direction 14. A unitary spacing 16 used as step size, is also easily understood. The structure as 18 can be regarded as a severe weed assembly in an else clean row with spaced crop structures of substantial size, similar to the digit-8 formed structure 19, also easily identifiable under the adjacent series of treatment means covering the row. It is easily understood how the weed structure during the pass of the inventive system from right to left in FIG. 3, at all mapped spots will receive ten consecutive part-treatments. As mentioned earlier, the relatively large number of mounting places for treatment means in each series (here ten), can beneficially be exploited to install a systematically repeated suite of different treatment means, to yield a possibility for a combined or further selected treatment, that may be repeated during the pass. Such possibility may e.g. be used to individually spray mutually chemically reactive components in the pure state on the selected spots, for mixing at the spot of intended reaction, thus avoiding reaction phenomena in the equipment. Possibly such reaction may be initiated by e.g. a heat pulse from a following unitary treatment means in the series.

In FIG. 3 the inventive series are organized strictly aligned in the square direction H-A, but this is not a requirement to the invention, as the point is, that each spot in each of the selected parallel strip(s) to add up to the total row width, must be systematically framed by more than one treatment means. Therefore adjacent series may be staggered both in the length direction 14 and also (a minor distance) in the square direction, e.g. to compensate for edge effects of non-uniformly deposited/applied treatment. If a very tight packing of target areas e.g. from narrowly "beaming" treatment means should be required, a layered setup with staggered series in different levels, also can be foreseen.

At last, FIG. 4 is showing—schematically—a top view of an example of a system 25 according to the present invention, with camera means 2, 3 mounted in front of a tractor, with treatment means mounted behind and organized as a set 24 for each of the three respective rows 7 shown. Each set 24 has three series 20, each of five consecutive treatment means 21. Other means 23 to simultaneously treat the areas between and to the lateral sides of the outer rows are also comprised. The most lateral camera means 22 and other treatment means 23 are reaching sufficiently far laterally out from the outer rows, to secure no unobserved/untreated areas of the soil between the neighbouring rows from different runs of the inventive system 25. Of course also all known mechanical treatment means can alternatively be used between/lateral to rows.

Compared to the prior art system in FIG. 1, the inventive system of FIG. 4, equipped with same types of spraying nozzles and using same herbicide solution, theoretically runs five times faster over the rows in the arrow 6 direction, with the same consumption of herbicide solution, and with substantially improved both quantity and quality of harvested crop, the latter advantage being due to statistically reduced harms from malfunctioning.

Of course, any suited methods, materials, components, treatments, alternatives, analogies and detailed designs and constructions etc, can be used in the realization of the possible embodiments of the systems according to the present invention, which all are scoped by the appended claims, as such realizations with knowledge to the information here given, presents no problem to a person skilled in the art.

The invention claimed is:

1. A system for selective treatment of plants arranged in rows comprising:
a camera arranged over a row of plants extending along a first direction;
a set of treatment units arranged at a first distance behind said camera along said first direction and over said row of plants;
means for moving said camera along said first direction while obtaining images of a target area comprising one or more plants in said row that are to be treated;
means for moving said set of treatment units along said first direction behind said camera while maintaining said first distance;
means for generating a map of digitized unitary spots covering said target area based on said obtained images and means for sending said generated map to a computing unit;
a plant treatment application executed by said computing unit and comprising means for adding spot-specific plant treatment instructions to said generated map;
means for synchronizing said set of treatment units to treat each of said unitary spots in said target area according to the spot-specific plant treatment instructions when said set of treatment units is positioned over each of said unitary spot at a treatment-time;
wherein said set of treatment units comprises a plurality of individually controllable treatment units arranged consecutively along the first direction and wherein each of said consecutively arranged individually controllable treatment units consecutively applies a fraction of the entire spot-specific plant treatment instructions to each unitary spot in the target area until the entire spot-specific plant treatment instructions are fulfilled.

2. The system of claim 1, wherein said generated map is sent to said computing unit in the form of an organized computer data structure.

3. The system of claim 1, wherein said unitary spots represent one or more plants or one or more parts of one or more plants or bare soil in the target area and wherein plant growth is either to be promoted, or to be neutrally left, or to be relatively retarded, or to be destroyed via said spot-specific plant treatment instructions and wherein said bare soil is either to be treated or not via said spot-specific plant treatment instructions.

4. The system of claim 1, wherein said synchronizing is based on calculations taking into consideration speed-of-movement data of said set of treatment units and of said camera and said first distance.

5. The system of claim 4, wherein said speed-of-movement data are maximized based on the type and efficiency of the treatment units and on the spot-specific plant treatment instructions.

6. The system of claim 1, wherein said set of treatment units comprises adjacent series of individual treatment units.

7. The system of claim 1, further comprising means for steering said set of series of individual treatment units based on said obtained images by said camera.

8. The system of claim 7, further comprising external means for steering the set of treatment units out of one plant row and into a second plant row.

9. The system of claim 7, further comprising means for automotive self-functioning.

10. The system of claim 1, further comprising a plurality of sets of treatment units, and wherein said sets of treatment units are parallel to each other and are mounted on a common structure extending perpendicular to said first direction.

11. The system of claim 10, further comprising means for adjusting the position of at least one of said sets of treatment units along said common structure.

12. The system of claim 10, further comprising treatments units configured to treat areas between two adjacent plant rows.

13. The system of claim 1, wherein said treatment units comprise one of burners, blow-evaporating fluid particle cannons, power lasers, hot or abrasive air-jets, hot or abrasive gas-jets, water-jets, spraying nozzles, or plasma jets.

14. The system of claim 1, wherein said treatment units are modularized for easy repair, service or exchange.

15. The system of claim 1, wherein said treatment units are individually controlled to function or not function substantially simultaneously.

16. The system of claim 1, wherein the treatment units in the set of treatment units are comprised of more than one type of treatment unit.

17. The system of claim 1, further comprising controllable illumination means allowing the system to operate during day and night.

18. A method for selective treatment of plants arranged in rows comprising:
- providing a camera arranged over a row of plants extending along a first direction;
- providing a set of treatment units arranged at a first distance behind said camera along said first direction and over said row of plants;
- moving said camera along said first direction while obtaining images of a target area comprising one or more plants in said row that are to be treated;
- generating a map of digitized unitary spots covering said target area based on said obtained images and sending said generated map to a computing unit;
- adding spot-specific plant treatment instructions to said generated map via a plant treatment application executed by said computing unit;
- synchronizing said set of treatment units to treat each of said unitary spots in said target area according to the spot-specific plant treatment instructions when said set of treatment units is positioned over each of said unitary spot at a treatment-time;
- moving said set of treatment units along said first direction behind said camera while maintaining said first distance and treating each of said unitary spots in the target area according to the spot-specific plant treatment instructions;
- wherein said set of treatment units comprises a plurality of individually controllable treatment units arranged consecutively along the first direction and wherein each of said consecutively arranged individually controllable treatment units consecutively applies a fraction of the entire spot-specific plant treatment instructions to each unitary spot in the target area until the entire spot-specific plant treatment instructions are fulfilled.

* * * * *